United States Patent
Hamann et al.

(10) Patent No.: US 10,102,606 B2
(45) Date of Patent: Oct. 16, 2018

(54) TRANSMISSION OF DATA BASED ON A CONFIGURATION DATABASE

(71) Applicant: Intel Corporation, Santa Clara, CA (US)

(72) Inventors: Michael T. Hamann, Portland, OR (US); Tony L. Lewis, Hillsboro, OR (US); Ganesh R. S. T., Bangalore (IN); Saumyajyoti Mukherjee, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 15/282,724

(22) Filed: Sep. 30, 2016

(65) Prior Publication Data

US 2018/0096447 A1  Apr. 5, 2018

(51) Int. Cl.
| | |
|---|---|
| *G06F 3/14* | (2006.01) |
| *G06T 1/20* | (2006.01) |
| *G06T 1/60* | (2006.01) |
| *G09G 5/00* | (2006.01) |
| *G09G 5/393* | (2006.01) |

(52) U.S. Cl.
CPC .................. *G06T 1/20* (2013.01); *G06F 3/14* (2013.01); *G06T 1/60* (2013.01); *G09G 5/006* (2013.01); *G09G 5/393* (2013.01); *G09G 2350/00* (2013.01); *G09G 2354/00* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 6,618,596 | B1 * | 9/2003 | Uchida | H04L 1/0002 455/12.1 |
| 2004/0267984 | A1 * | 12/2004 | Fukushima | G06F 13/1694 710/60 |
| 2005/0134547 | A1 * | 6/2005 | Wyatt | G09G 3/3406 345/102 |
| 2006/0171414 | A1 * | 8/2006 | Katibian | H04L 47/10 370/468 |
| 2007/0150929 | A1 * | 6/2007 | Kizaki | H04N 21/43637 725/132 |
| 2009/0060455 | A1 * | 3/2009 | Pan | H04N 5/602 386/353 |
| 2010/0073574 | A1 * | 3/2010 | Nakajima | G06F 3/14 348/723 |
| 2010/0149172 | A1 * | 6/2010 | Tokumasu | G06F 1/10 345/214 |
| 2010/0182402 | A1 * | 7/2010 | Nakajima | G09G 5/006 348/42 |

(Continued)

*Primary Examiner* — Joni Richer
(74) *Attorney, Agent, or Firm* — International IP Law Group, P.L.L.C.

(57) ABSTRACT

In one example, a system for transmitting data comprises a processor to load a configuration database into memory accessible by the graphics processing unit. The processor can also detect a predetermined maximum data rate to be supported by a transmitter from the configuration database. Furthermore, the processor can transmit data from the graphics processing unit to a sink device at the predetermined maximum data rate via the transmitter and a high-definition multimedia interface link.

23 Claims, 4 Drawing Sheets

(56) References Cited

U.S. PATENT DOCUMENTS

2010/0287137 A1* 11/2010 Lyakhovitskiy .. G06F 17/30067
　　　　　　　　　　　　　　　　　　　　　707/609
2014/0090010 A1* 3/2014 Fletcher ................. G06F 21/00
　　　　　　　　　　　　　　　　　　　　　726/1

* cited by examiner

TRANSMISSION OF DATA BASED ON A CONFIGURATION DATABASE

TECHNICAL FIELD

This disclosure relates generally to transmitting data and specifically, but not exclusively, to enabling a graphics processing unit to transmit data based on values stored in a configuration database.

BACKGROUND

Computing devices can transmit data to display devices using various protocols and ports. In some examples, a high-definition multimedia interface (HDMI) link is designed to transmit data from a computing device to a display device based on the capabilities of the display system, the capabilities of the computing device, and capabilities of a physical interconnect. For example, a data rate for the high-definition multimedia interface link can be set by a transmitter in the computing device based on capabilities of a connected display system.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENT

As discussed above, a computing device can transmit data to a display device using any suitable display interface, which can include a graphics processing unit (GPU), a transmitter, and any suitable physical interconnect, among others. A physical interconnect or link, as referred to herein, can include any suitable port that serves as an interface between a display device and a computing device. A transmitter, as referred to herein, can forward data from a graphics processing unit to the physical interconnect. In some embodiments, a transmitter and physical interconnect can be electronically coupled to a graphics processing unit in a display interface. However, the graphics processing unit may not have information about the capabilities of a connected physical interconnect. Therefore, a graphic processing unit may attempt to transmit data to the display device using a maximum data rate supported by the display device. However, any computing device that includes a lower cost physical interconnect may not support the data rate of the display device. Thus, the low cost physical interconnect of a computing device can result in display issues such as no image appearing on a display device, a display device with a flickering screen, or errors in images.

The techniques described herein include transmitting data from a computing device to a display device without any display issues. For example, a system can load a video-bins configuration database into memory accessible by a graphics processing unit. In some embodiments, the video-bios configuration database may be, for example, a video BIOS table that may be stored in, for example, an advanced configuration and power interface (ACPI) Opregion of BIOS. The memory accessible by the graphics processing unit can include a register, a file stored in a system storage, a file stored in a system registry, or a basic input/output system (BIOS) comprising a video BIOS, among others. In some embodiments, the video-bins configuration database includes a predetermined maximum data rate for a graphics processing unit of a computing device. In some embodiments, a system can detect a predetermined maximum data rate to be supported by the graphics processing unit from the video-bios configuration database and transmit data from the graphics processing unit to a sink device, such as a display device, at the predetermined maximum data rate via a high-definition multimedia interface link, or any other suitable communication link. For example, the system can limit the bandwidth of data transmitted by the graphics processing unit to the sink device based on the predetermined maximum data rate to be supported by a transmitter coupled to the graphics processing unit. In some embodiments, the predetermined maximum data rate is based on characteristics of the system such as capabilities of a source channel, and the like.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
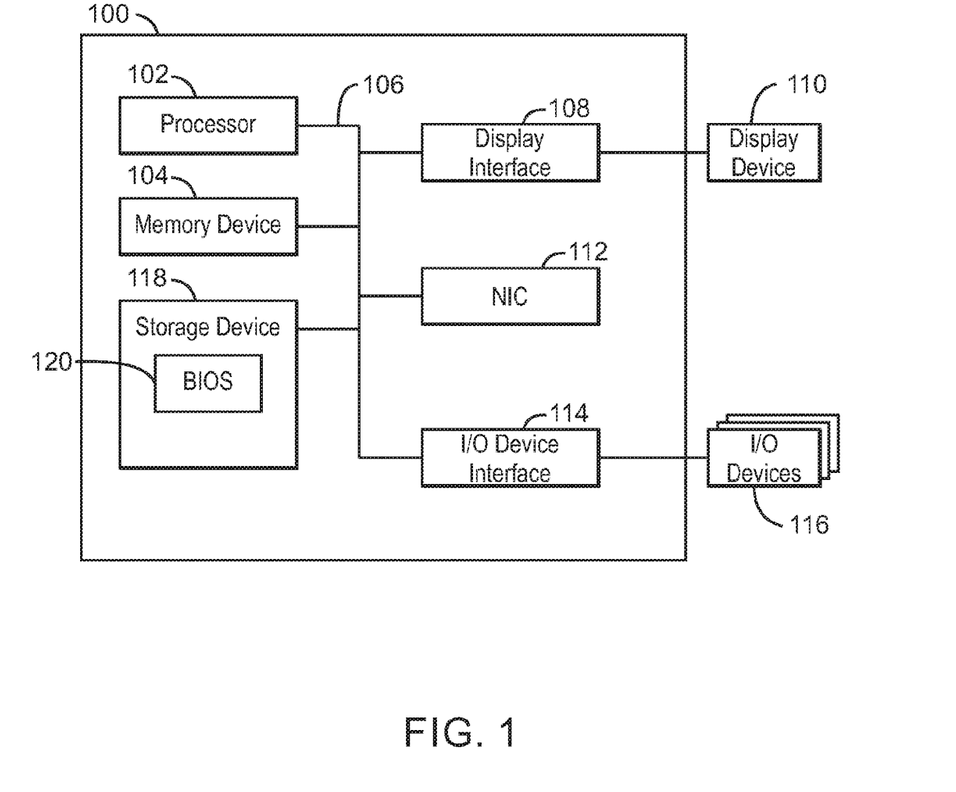
FIG. 1 illustrates a block diagram of a computing device that can transmit data at a predetermined data rate to a display device.

FIG. 1 is a block diagram of an example of a computing device that can transmit data at a predetermined data rate to a display device. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit data at a predetermined data rate to a display device.

The processor 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

In some embodiments, the display interface 108 can include any suitable graphics processing unit, transmitter, port, physical interconnect, and the like. In some examples, the display interface 108 can implement any suitable protocol for transmitting data to the display device 110. For example, the display interface 108 can transmit data using a high-definition multimedia interface (HDMI) protocol, and the like. In some embodiments, the display interface 108 can detect a predetermined maximum data rate supported by a physical interconnect in the display interface 108. The predetermined maximum data rate for the physical interconnect can be detected from a video-bins configuration database loaded into memory accessible by the display interface 108. The display interface 108 can transmit data to a display device 110, or any other suitable sink device, at the predetermined maximum data rate via a high-definition multimedia interface link, or any other suitable protocol or communication link.

In addition, a network interface controller (also referred to herein as a NIC) 112 may be adapted to connect the computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

In some embodiments, the processor 102 may also be linked through the system interconnect 106 to a storage device 118 that can include a hard drive, an optical drive, a USB flash drive, an array of drives, or any combinations thereof. In some embodiments, the storage device 118 can include any suitable applications. In some embodiments, the storage device 118 can include a basic input/output system (BIOS) 120. In some embodiments, the BIOS 120 can load a video-bins configuration database into memory accessible by the graphics processing unit. Accordingly, in some examples, the BIOS 120 can enable the display interface 108 to transmit data to the display device 110 at a predetermined maximum data rate.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the BIOS 120 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the BIOS 120 can be implemented with logic, wherein the logic, as referred to herein, can include any suitable hardware (e.g., a processor, among others), software (e.g., an application, among others), firmware, or any suitable combination of hardware, software, and firmware.

Figure 2:
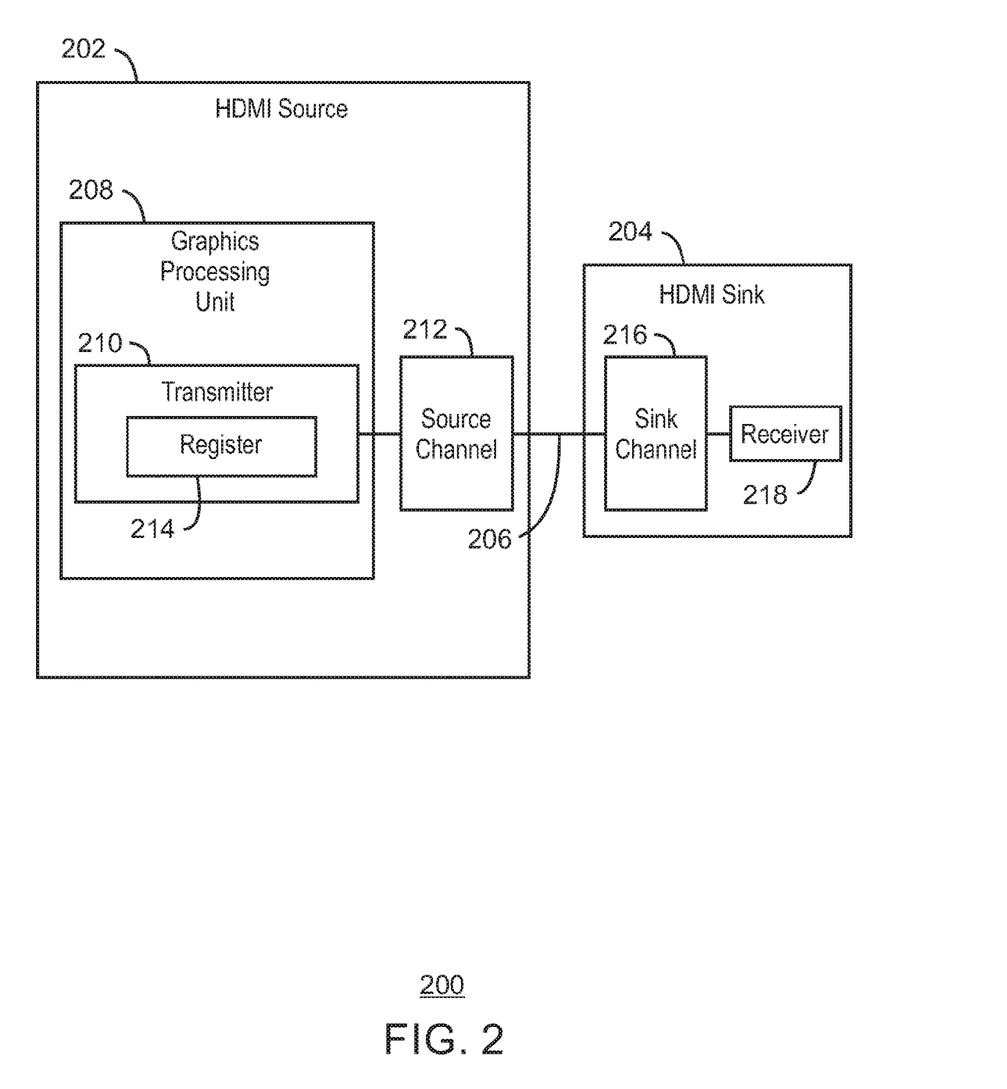
FIG. 2 illustrates a block diagram of a computing device and display device that can communicate at a predetermined data rate.

FIG. 2 illustrates a block diagram of an example computing device and display device that can communicate at a predetermined data rate. In some embodiments, the computing device. such as computing device 100 of FIG. 1, can include an HDMI source 202 that can transmit data to an HDMI sink 204 via an HDMI cable 206. The HDMI source 202 can include any suitable graphics processing unit 208, transmitter 210, display interface, and the like. In some embodiments, the transmitter 210 can be electronically coupled to the graphics processing unit 208 or reside within the graphics processing unit 208. In some examples, the HDMI sink 204 can include any suitable display device, among others. The HDMI cable 206 can include any number of wires to transmit data between the HDMI source 202 and the HDMI sink 204.

In some embodiments, the graphics processing unit 208 can transmit data corresponding to images to be displayed on an HDMI sink 204 via a source channel 212. The source channel 212 can transmit data using any suitable predetermined maximum data rate stored in a register 214 accessible by the transmitter 210. Accordingly, the source channel 212 can support a wide range of bandwidths or data transfer rates between the graphics processing unit 208 and the HDMI sink 204. In some examples, the source channel 212 supports any suitable HDMI transfer rate. In some embodiments, a sink channel 216 in the HDMI sink 204 can receive the data from the source channel 212 and transmit the data to a receiver 218. The receiver 218 can enable the HDMI sink 204 to display the data received by the graphics processing unit 210. In some embodiments, the predetermined maximum data rate is based on characteristics of the source channel 212 such as a maximum bandwidth supported by the source channel 212.

It is to be understood that the block diagram of FIG. 2 is not intended to indicate that the HDMI source 202 is to include all of the components shown in FIG. 2. Rather, the HDMI source 202 can include fewer or additional components not illustrated in FIG. 2 (e.g., additional memory components, embedded controllers, additional sensors, additional interfaces, etc.).

Figure 3:
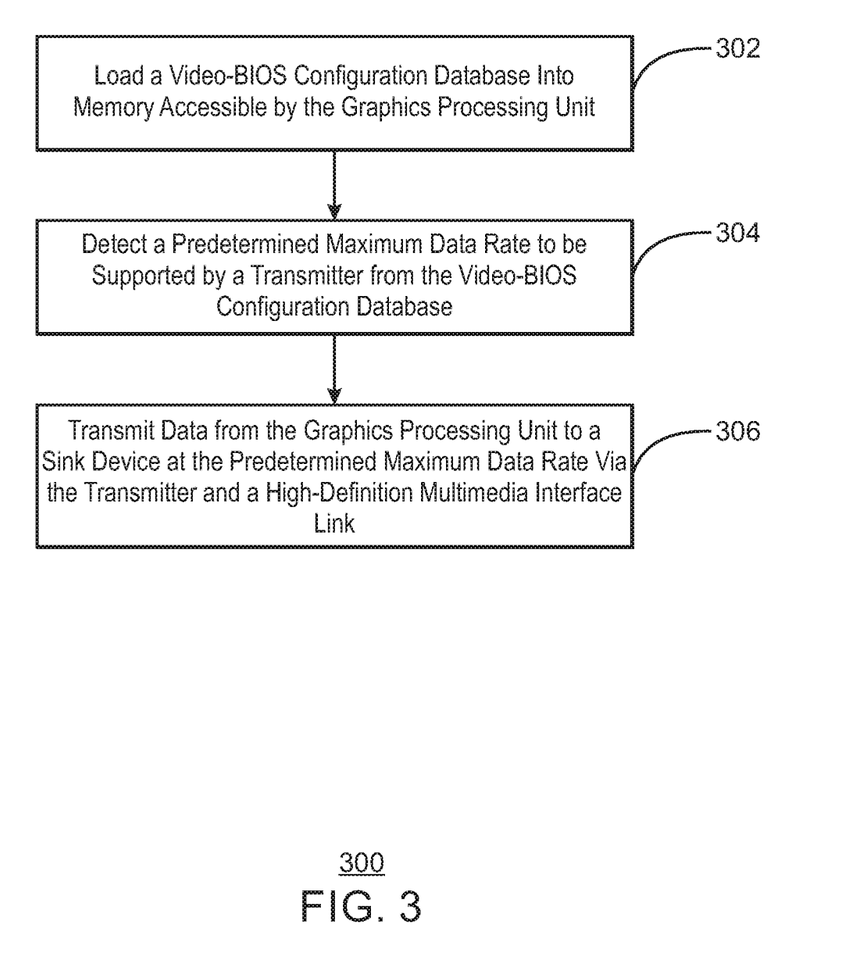
FIG. 3 illustrates a process flow diagram for transmitting data at a predetermined data rate to a display device.

FIG. 3 illustrates a process flow diagram for transmitting data. The method 300 illustrated in FIG. 3 can be implemented with any suitable computing component or device, such as the computing device 100 of FIG. 1.

At block 302, the BIOS 120 can load a video-bins configuration database into memory accessible by the graphics processing unit. In some examples, the memory accessible by the graphics processing unit can include a register, a file stored in a system storage, a file stored in a system registry, or a basic input/output system (BIOS) comprising a video BIOS, among others. In some embodiments, the video-bins configuration database can include a predetermined maximum data rate to be supported by a graphics processing unit. The predetermined maximum data rate may be determined by an original equipment manufacturer of the graphics processing unit or system in which the graphics processing unit resides, among others. In some examples, firmware of a graphics processing unit or display interface can be modified to load the video-bins configuration database into a register during an initialization process. In some embodiments, the video-bias configuration database is loaded into a register prior to loading an operating system.

At block 304, a display interface 108 can detect a predetermined maximum data rate to be supported by a transmitter from the video-bias configuration database. For example, the display interface 108 can access memory, such as a register of the graphics processing unit, to read the predetermined maximum data rate. In some embodiments, the register can be associated with a basic input/output system (BIOS). The predetermined maximum data rate can enable a display interface or graphics processing unit to match a variability in performance for any number of computing devices. For example, the predetermined maximum data rate enables a graphics processing unit to avoid exceeding a maximum data transfer capability of any suitable transmitter, source channel, or microcontroller coupled to the graphics processing unit.

At block 306, the display interface 108 can transmit data from the graphics processing unit to a sink device at the predetermined maximum data rate via a transmitter and a high-definition multimedia interface link. In some embodiments, the sink device can be any suitable display device, among others. The display interface 108 can prevent data from being transferred from the graphics processing unit to the sink device at any transfer rate that exceeds the predetermined maximum data rate. In some examples, transfer rates that exceed the predetermined maximum data rate are disabled or pruned by a computing device.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. In some embodiments, a system integrator can access a configuration tool and set the predetermined maximum data rate. In some examples, an operating system can use the predetermined maximum data rate to load applications. In some embodiments, a driver for an operating system can downgrade a data transfer rate if a display device operates at a bandwidth that exceeds the predetermined maximum data rate value based on capabilities of a computing device. In some embodiments, the BIOS 120 can detect a selection from the list of display transfer rate options and modify a setting in the register based on the selection. The setting can indicate a modified maximum data rate for a graphics processing unit.

In some embodiments, the BIOS 120 can provide a list of display transfer rate options to a user to modify the predetermined maximum data rate. The transmitter can also, in some examples, remove at least one display transfer rate option from the list, wherein the at least one removed display transfer rate option corresponds to at least one data transfer rate that exceeds the predetermined maximum data rate. In some embodiments, the BIOS 120 can detect that the sink device comprises a capability to transfer data at a rate that exceeds the predetermined maximum data rate of the system and prevent the system from transmitting data at a rate that exceeds the predetermined maximum data rate.

Figure 4:
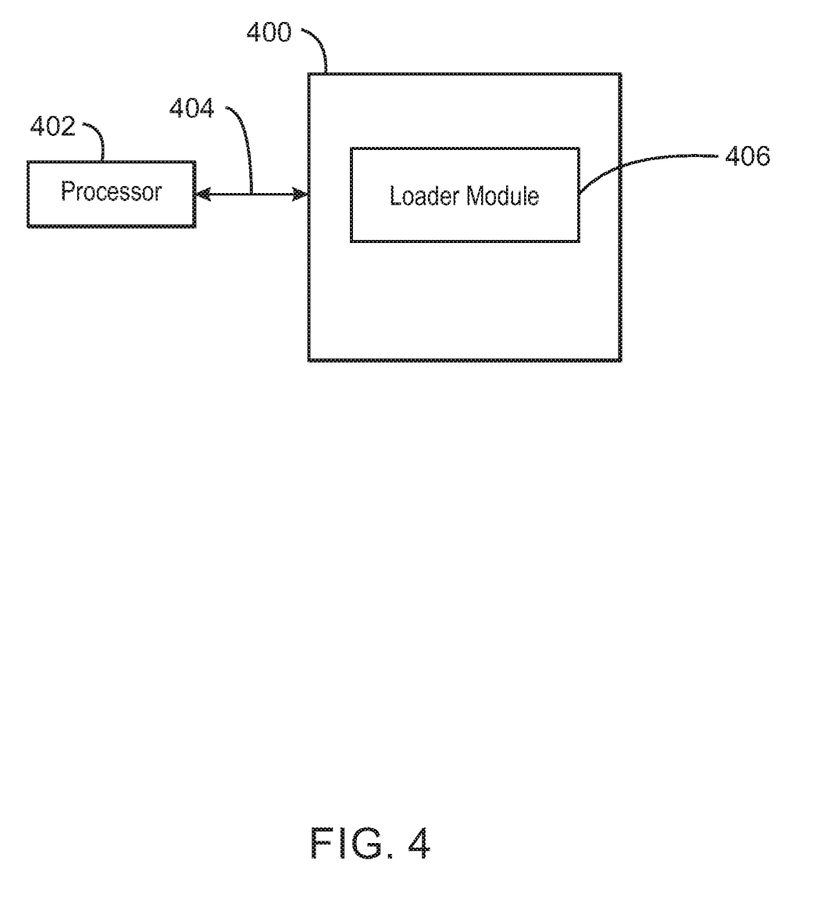
FIG. 4 illustrates a block diagram of a non-transitory computer readable media for transmitting data at a predetermined data rate to a display device.

FIG. 4 is a block diagram of an example of a tangible, non-transitory computer readable media for transmitting data at a predetermined data rate to a display device. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a loader module 406 may be adapted to direct the processor 402 to load a video-bias configuration database into memory accessible by the graphics processing unit. The loader module 406 can also detect a predetermined maximum data rate to be supported by the graphics processing unit from the video-bins configuration database and transmit data from the graphics processing unit to a sink device at the predetermined maximum data rate via a high-definition multimedia interface link.

It is to be understood that any suitable number of the software components shown in FIG. 4 may be included within the tangible, non-transitory computer-readable medium 400. Furthermore, any number of additional software components not shown in FIG. 4 may be included within the tangible, non-transitory, computer-readable medium 400, depending on the specific application

EXAMPLE 1

In some examples, a system for transmitting data comprises a graphics processing unit that can load a configuration database into memory accessible by the graphics processing unit. The graphics processing unit can also detect a predetermined maximum data rate to be supported by a transmitter from the configuration database and transmit data from the graphics processing unit to a sink device at the predetermined maximum data rate via the transmitter and a high-definition multimedia interface link.

Alternatively, or in addition, the graphics processing unit can provide a list of display transfer rate options to a user to enable the user to modify the predetermined maximum data rate. Alternatively, or in addition, the graphics processing unit can remove at least one display transfer rate option from the list, wherein the at least one removed display transfer rate option corresponds to at least one data transfer rate that exceeds the predetermined maximum data rate. Alternatively, or in addition, the configuration database can include a single predetermined maximum data rate provided by an original equipment manufacturer corresponding to the system. Alternatively, or in addition, the graphics processing unit can load a driver to enable loading the predetermined maximum data rate from the configuration database into a register. Alternatively, or in addition, the graphics processing unit can detect a selection from the list of display transfer rate options and modify a setting in a register based on the selection. Alternatively, or in addition, the setting can indicate a modified maximum data rate. Alternatively, or in addition, the graphics processing unit can transmit a value corresponding to the predetermined maximum data rate to an operating system to enable the operating system to load an application based on the predetermined maximum data rate. Alternatively, or in addition, the graphics processing can detect that the sink device comprises a capability to transfer data at a rate that exceeds the predetermined maximum data rate of the transmitter and prevent the graphics processing unit from transmitting data at a rate that exceeds the predetermined maximum data rate. Alternatively, or in addition, the memory accessible by the graphics processing unit can include a register, a file stored in a system storage, a file stored in a system registry, or a basic input/output system (BIOS) comprising a video BIOS. Alternatively, or in addition, the configuration database comprises a video BIOS table.

EXAMPLE 2

In some examples, a method for transmitting data includes loading a configuration database into memory accessible by the graphics processing unit. The method can also include detecting a predetermined maximum data rate to be supported by a transmitter from the configuration database; and transmitting data from the graphics processing unit to a sink device at the predetermined maximum data rate via the transmitter and a high-definition multimedia interface link.

Alternatively, or in addition, the method can include providing a list of display transfer rate options to a user to enable the user to modify the predetermined maximum data rate. Alternatively, or in addition, the method can include removing at least one display transfer rate option from the list, wherein the at least one removed display transfer rate option corresponds to at least one data transfer rate that exceeds the predetermined maximum data rate. Alternatively, or in addition, the configuration database can include a single predetermined maximum data rate provided by an original equipment manufacturer corresponding to the system. Alternatively, or in addition, the method can include loading a driver to enable loading the predetermined maximum data rate from the configuration database into a register. Alternatively, or in addition, the method can include detecting a selection from the list of display transfer rate options and modifying a setting in a register based on the selection. Alternatively, or in addition, the setting can indicate a modified maximum data rate. Alternatively, or in addition, the method can include transmitting a value corresponding to the predetermined maximum data rate to an operating system to enable the operating system to load an application based on the predetermined maximum data rate. Alternatively, or in addition, the method can include detecting that the sink device comprises a capability to transfer data at a rate that exceeds the predetermined maximum data rate of the transmitter and preventing the graphics processing unit from transmitting data at a rate that exceeds the predetermined maximum data rate. Alternatively, or in addition, the memory accessible by the graphics processing unit can include a register, a file stored in a system storage, a file stored in a system registry, or a basic input/output system (BIOS) comprising a video BIOS. Alternatively, or in addition, the configuration database comprises a video BIOS table.

EXAMPLE 3

In some examples, a tangible, non-transitory computer readable medium for transmitting data includes a plurality of instructions that, in response to being executed on a processor, cause the processor to load a configuration database into a register of the graphics processing unit. The plurality of instructions can also cause the processor to detect a predetermined maximum data rate to be supported by a transmitter from the configuration database and transmit data from the graphics processing unit to a sink device at the predetermined maximum data rate via the transmitter and a high-definition multimedia interface link.

Alternatively, or in addition, the plurality of instructions can cause the processor to provide a list of display transfer rate options to a user to enable the user to modify the predetermined maximum data rate. Alternatively, or in addition, the plurality of instructions can cause the processor to remove at least one display transfer rare option from the list, wherein the at least one removed display transfer rate option corresponds to at least one data transfer rate that exceeds the predetermined maximum data rate. Alternatively, or in addition, the configuration database can include a single predetermined maximum data rate provided by an original equipment manufacturer corresponding to the system. Alternatively, or in addition, the plurality of instructions can cause the processor to load a driver to enable loading the predetermined maximum data rate from the configuration database into a register. Alternatively, or in addition, the plurality of instructions can cause the processor to detect a selection from the list of display transfer rate options and modify a setting in a register based on the selection. Alternatively, or in addition, the setting can indicate a modified maximum data rate. Alternatively, or in addition, the plurality of instructions can cause the processor to transmit a value corresponding to the predetermined maximum data rate to an operating system to enable the operating system to load an application based on the predetermined maximum data rate. Alternatively, or in addition, the plurality of instructions can cause the processor to detect that the sink device comprises a capability to transfer data at a rate that exceeds the predetermined maximum data rate of the transmitter and prevent the graphics processing unit from transmitting data at a rare that exceeds the predetermined maximum data rate. Alternatively, or in addition, the memory accessible by the graphics processing unit can include a register, a file stored in a system storage, a file stored in a system registry, or a basic input/output system (BIOS) comprising a video BIOS. Alternatively, or in addition, the configuration database comprises a video BIOS table.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances. well-known features, components. or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design. which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software. in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppydisks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for transmitting data comprising:
   a graphics processing unit to:
      load a configuration database into memory accessible by the graphics processing unit;
      detect a predetermined maximum data rate to be supported by a transmitter from the configuration database;
      transmit data from the graphics processing unit to a sink device at the predetermined maximum data rate via the transmitter and a high-definition multimedia interface link; and
      transmit a value corresponding to the predetermined maximum data rate to an operating system to enable the operating system to load an application based on the predetermined maximum data rate.

2. The system of claim 1, wherein the graphics processing unit is to provide a list of display transfer rate options to a user to enable the user to modify the predetermined maximum data rate.

3. The system of claim 2, wherein the graphics processing unit is to remove at least one display transfer rate option from the list, wherein the at least one removed display transfer rate option corresponds to at least one data transfer rate that exceeds the predetermined maximum data rate.

4. The system of claim 2, wherein the graphics processing unit is to detect a selection from the list of display transfer rate options and modify a setting in a register based on the selection.

5. The system of claim 4, wherein the setting indicates a modified maximum data rate.

6. The system of claim 1, wherein the configuration database comprises a single predetermined maximum data rate provided by an original equipment manufacturer corresponding to the system.

7. The system of claim 1, wherein the graphics processing unit is to load a driver to enable loading the predetermined maximum data rate from the configuration database into a register.

8. The system of claim 1, wherein the graphics processing unit is to:
   detect that the sink device comprises a capability to transfer data at a rate that exceeds the predetermined maximum data rate of the transmitter; and
   prevent the graphics processing unit from transmitting data at a rate that exceeds the predetermined maximum data rate.

9. The system of claim 1, wherein the memory accessible by the graphics processing unit comprises a register, a file stored in a system storage, a file stored in a system registry, or a basic input/output system (BIOS) comprising a video BIOS.

10. The system of claim 1, wherein the configuration database comprises a video basic input/output system (BIOS) table.

11. A method for transmitting data comprising:
    loading a configuration database into memory accessible by a graphics processing unit;
    detecting a predetermined maximum data rate to be supported by a transmitter from the configuration database;
    transmitting data from the graphics processing unit to a sink device at the predetermined maximum data rate via the transmitter and a high-definition multimedia interface link; and
    transmitting a value corresponding to the predetermined maximum data rate to an operating system to enable the operating system to load an application based on the predetermined maximum data rate.

12. The method of claim 11, comprising providing a list of display transfer rate options to a user to enable the user to modify the predetermined maximum data rate.

13. The method of claim 12, comprising removing at least one display transfer rate option from the list, wherein the at least one removed display transfer rate option corresponds to at least one data transfer rate that exceeds the predetermined maximum data rate.

14. The method of claim 12, comprising detecting a selection from the list of display transfer rate options and modifying a setting in a register based on the selection.

15. The method of claim 11, wherein the configuration database comprises a single predetermined maximum data rate provided by an original equipment manufacturer corresponding to the system.

16. The method of claim 11, comprising loading a driver to enable loading the predetermined maximum data rate stored in the configuration database into a register of the graphics processing unit.

17. The method of claim 11, comprising:
   detecting that the sink device comprises a capability to transfer data at a rate that exceeds the predetermined maximum data rate of the transmitter; and
   preventing the graphics processing unit from transmitting data at a rate that exceeds the predetermined maximum data rate.

18. The method of claim 11, wherein the memory accessible by the graphics processing unit comprises a register, a file stored in a system storage, a file stored in a system registry, or a basic input/output system (BIOS) comprising a video BIOS.

19. The method of claim 11, wherein the configuration database comprises a video basic input/output system (BIOS) table.

20. A tangible, non-transitory computer readable medium for transmitting data comprising a plurality of instructions that, in response to being executed on a processor, cause the processor to:
   load a configuration database into a register of a graphics processing unit;
   detect a predetermined maximum data rate to be supported by a transmitter from the configuration database;
   transmit data from the graphics processing unit to a sink device at the predetermined maximum data rate via the transmitter and a high-definition multimedia interface link; and
   transmit a value corresponding to the predetermined maximum data rate to an operating system to enable the operating system to load an application based on the predetermined maximum data rate.

21. The tangible, non-transitory computer readable medium of claim 20, wherein the instructions cause the processor to provide a list of display transfer rate options to a user to enable the user to modify the predetermined maximum data rate.

22. The tangible, non-transitory computer readable medium of claim 21, wherein the instructions cause the processor to remove at least one display transfer rate option from the list, wherein the at least one removed display transfer rate option corresponds to at least one data transfer rate that exceeds the predetermined maximum data rate.

23. The tangible, non-transitory computer readable medium of claim 20, wherein the configuration database comprises a video basic input/output system (BIOS) table.

* * * * *